United States Patent [19]

Black

[11] 3,991,694
[45] Nov. 16, 1976

[54] WIND-PROPELLED APPARATUS

[76] Inventor: Robert Bruce Black, 5525 Sepulveda Court, Concord, Calif. 94521

[22] Filed: Jan. 28, 1974

[21] Appl. No.: 438,371

Related U.S. Application Data

[62] Division of Ser. No. 285,461, Aug. 31, 1972, Pat. No. 3,831,539.

[52] U.S. Cl. .................................. 114/39; 114/43; 114/164; 280/16
[51] Int. Cl.² ..................................... B63B 39/00
[58] Field of Search ................. 114/39, 43, 66.5 R, 114/123, 163, 164; 280/213, 16, 12 K, 12 KL, 12 A, 12 R

[56] References Cited
UNITED STATES PATENTS

| | | | |
|---|---|---|---|
| 831,636 | 9/1906 | Suhm | 114/39 |
| 2,106,432 | 1/1938 | McIntyre | 114/39 |
| 2,238,464 | 4/1941 | Fletcher | 114/39 |
| 3,008,442 | 11/1961 | Russell | 114/39 |
| 3,094,961 | 6/1963 | Smith | 114/39 |
| 3,390,656 | 7/1968 | Flowers | 114/39 |
| 3,646,902 | 3/1972 | Smith | 114/39 |
| 3,870,004 | 3/1975 | Bailey | 114/43 |

Primary Examiner—Trygve M. Blix
Assistant Examiner—Charles E. Frankfort
Attorney, Agent, or Firm—Flehr, Hohbach, Test, Albritton & Herbert

[57] ABSTRACT

Wind-Propelled craft including a transport carrying a sail and including a support vehicle pulled by the transport. The support vehicle is pivotally secured to the transport. The transport and sail turn as one unit relative to the support vehicle about an axis so that the transport can assume any number of angles relative to the support vehicle. The transport and support vehicle operate with high capsize resistance for all headings of the wind.

2 Claims, 13 Drawing Figures

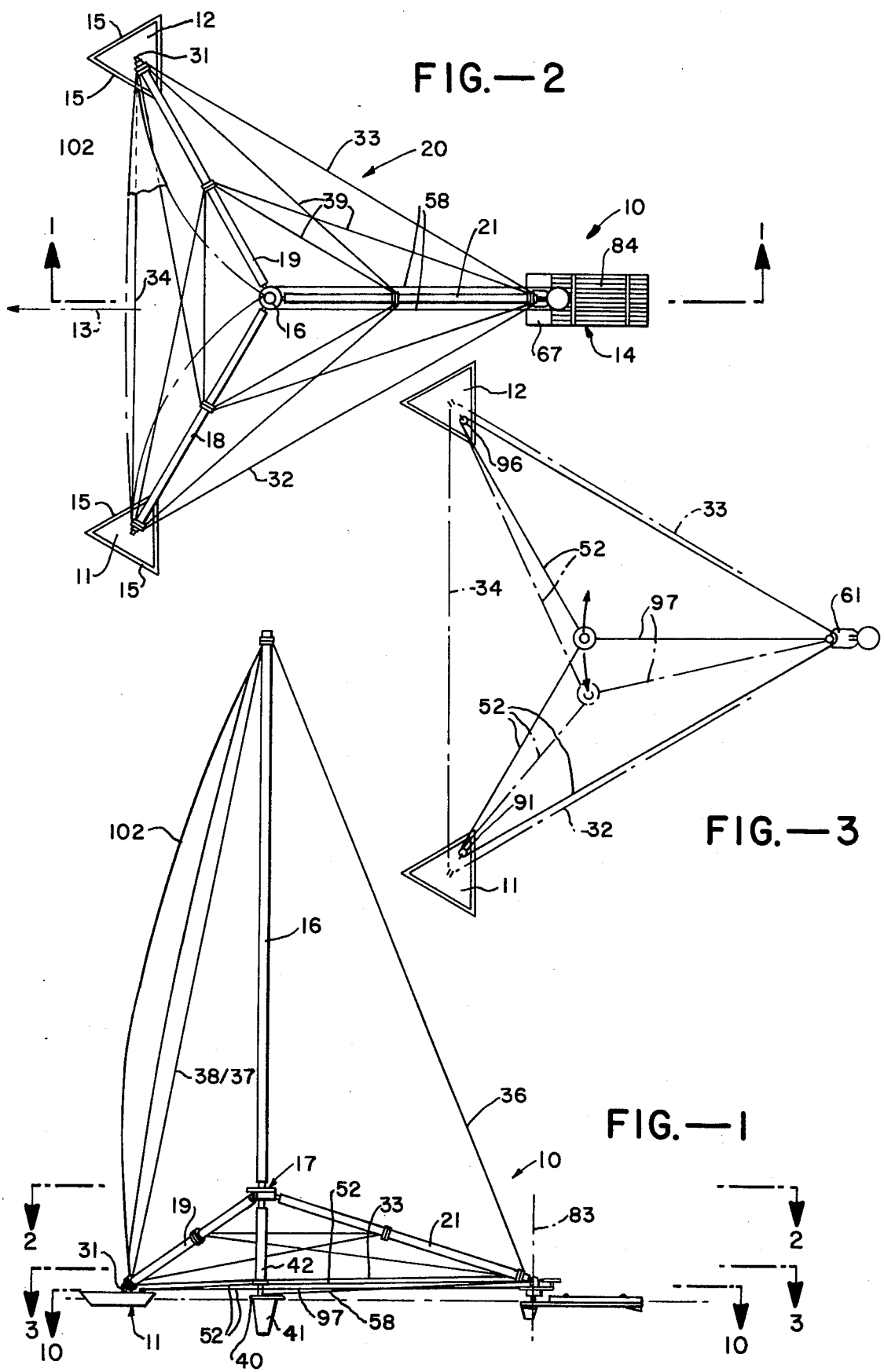

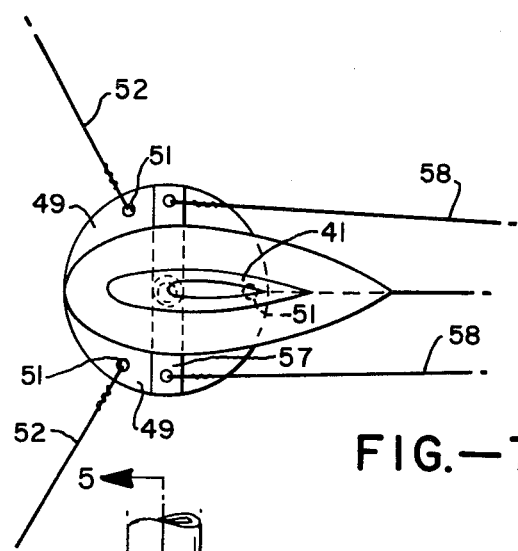
FIG.—7
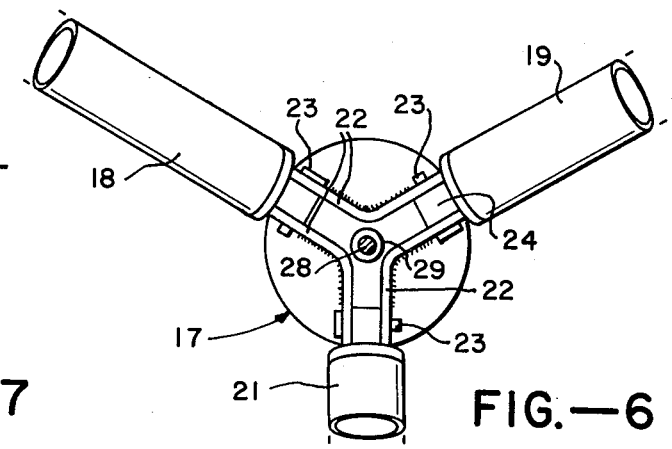
FIG.—6
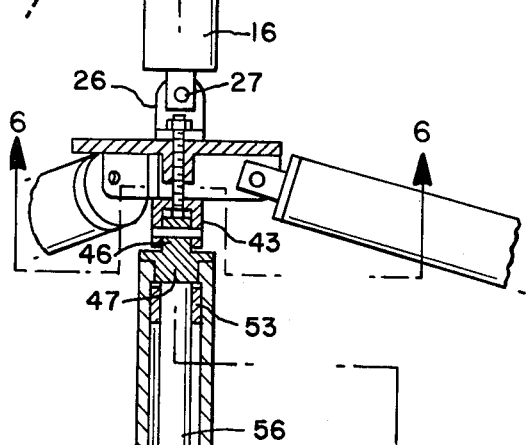
FIG.—4
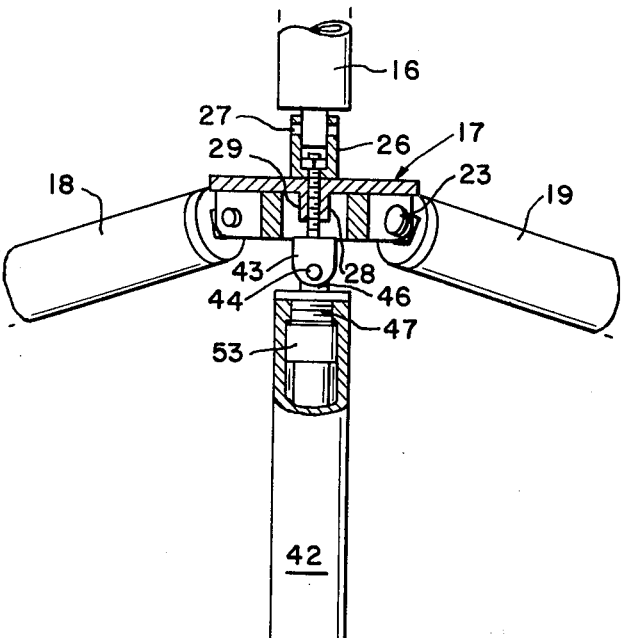
FIG.—5

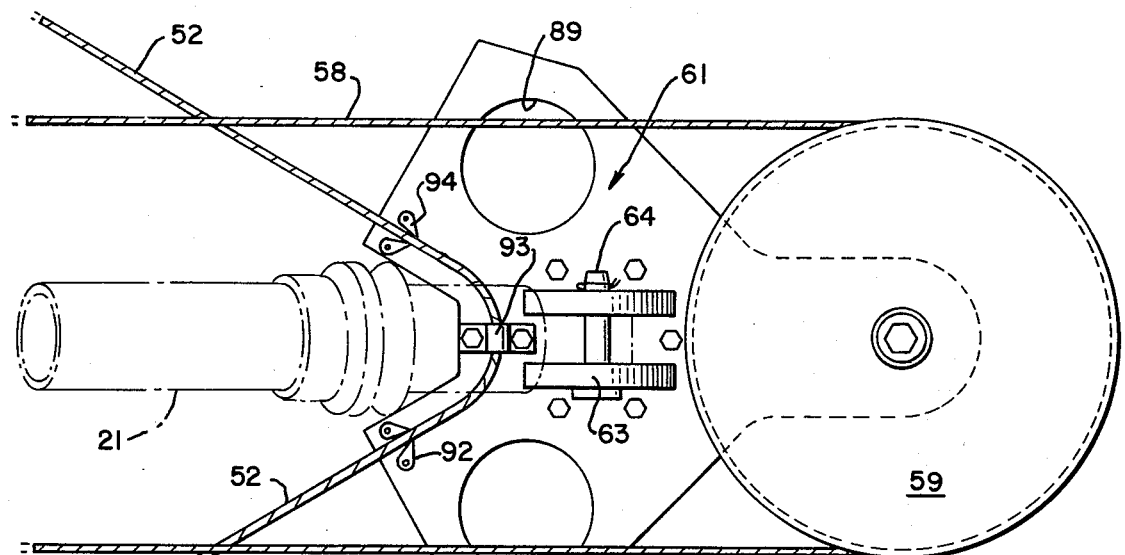
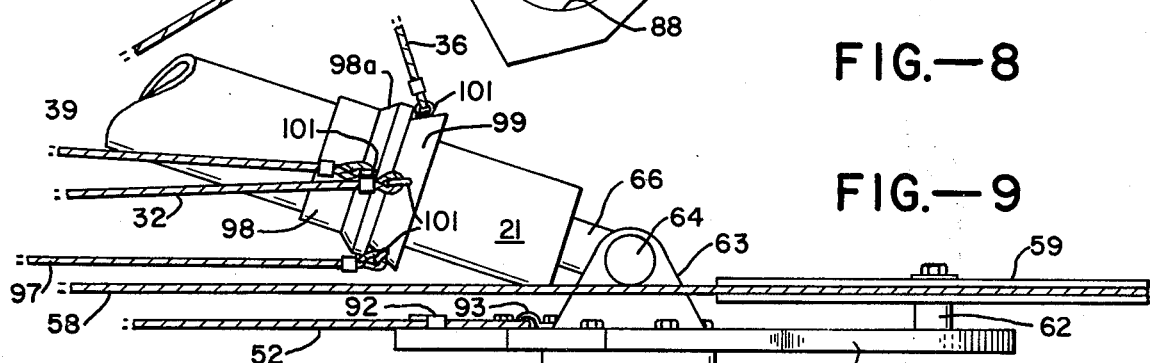
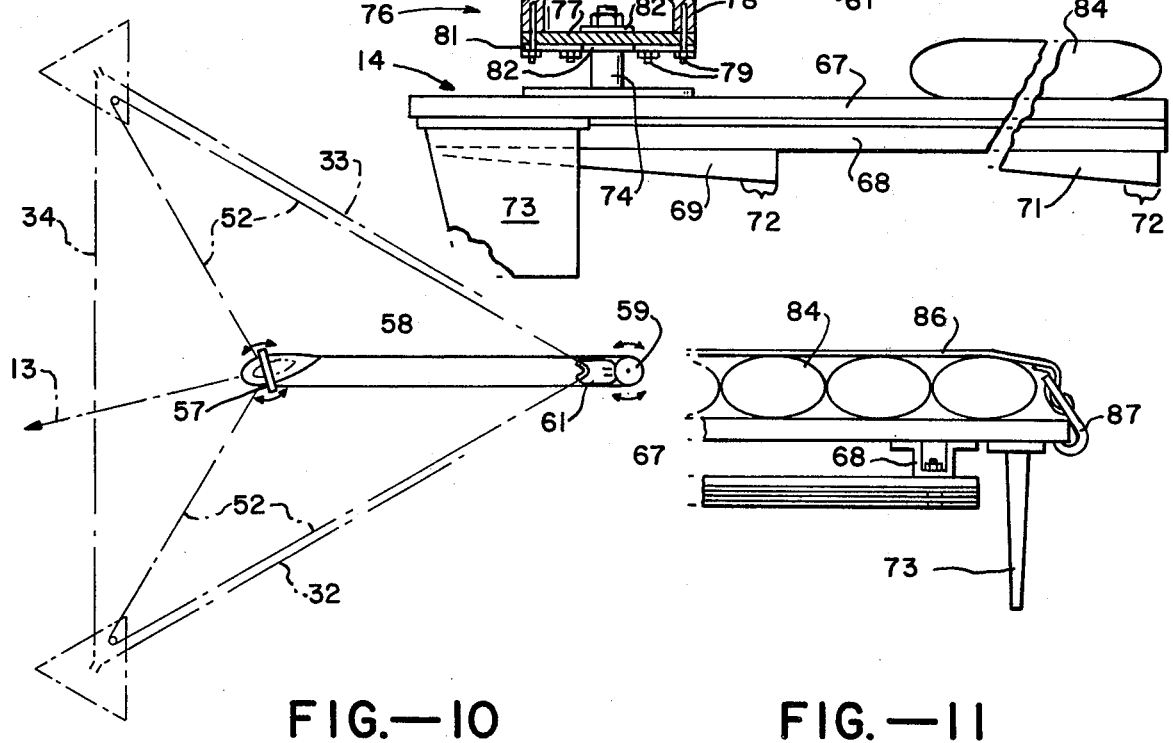
FIG.—8
FIG.—9
FIG.—10
FIG.—11

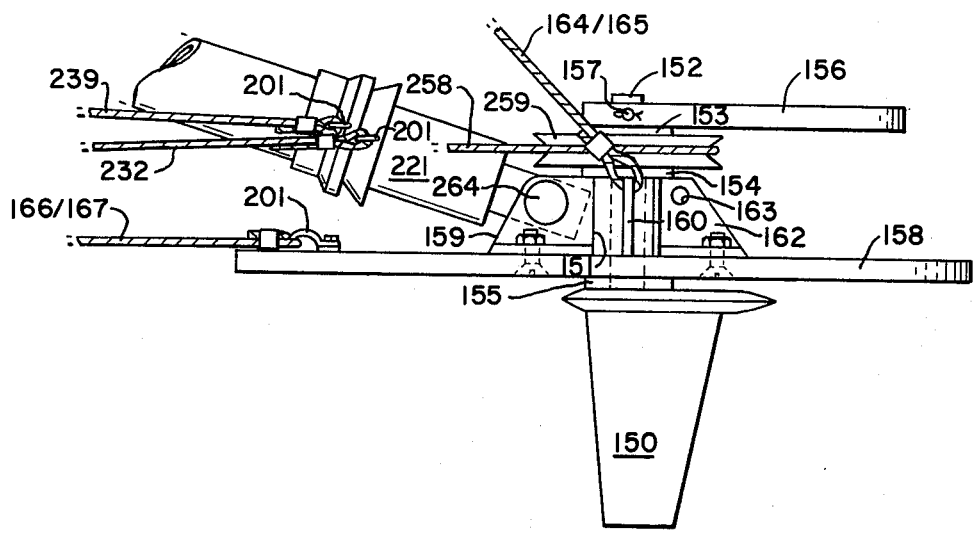
FIG.—12
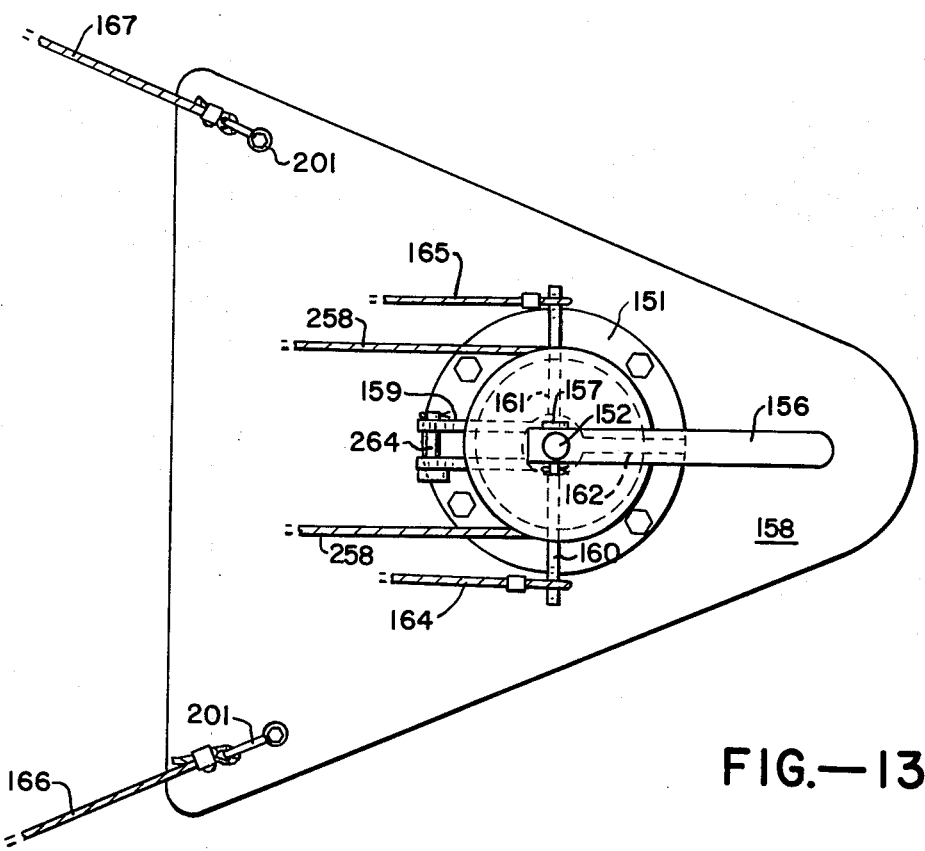
FIG.—13

WIND-PROPELLED APPARATUS

This application is a division of application Ser. No. 285,461, filed Aug. 31, 1972 and now U.S. Pat. No. 3,831,539.

BACKGROUND OF THE INVENTION

This invention pertains to wind-propelled apparatus particularly useful in a craft of limited bulk and displacement operated by a single person, and also useful as a portable sailing rig.

Heretofore, various relatively simple sailing craft have been provided with greater or lesser effectiveness, but typically most of these craft have been characterized by large bulk and inconvenience relative to handling and storage. Many of these simple craft have also been characterized by a tendency to capsize under heavy sail loading conditions.

Portable sailing rigs for furnishing propulsion to outboard motorboats, rafts, etc., have been heretofore provided, by typically most of these devices have been relatively limited in efficiency and the types of tasks they can perform.

Accordingly, there is provided herein a wind-propelled apparatus useful both as an improved sailing craft and as an improved portable sailing rig.

SUMMARY OF THE INVENTION AND OBJECTS

In accordance with the present invention, a triangular sail secured at the three corners by a lightweight frame has been provided, supported by a pair of spaced, surface engaging transit members disposed generally beneath the lower two corners of the sail. Provision is made for a user to be positioned in a spaced relationship with the sail in a manner that results in maximum capsize resistance on all headings, thus a large sail can be utilized effectively. The user can be supported by a vehicle such as a small boat pivotally attached to the frame. Alternately, a swimmer, skater, etc., can be towed by the apparatus. The apparatus is primarily useful for sailing on water, but has certain aspects which may be utilized for sailing on ice and land.

It is an object of the present invention to provide an improved wind-propelled craft of a type which is generally of lightweight construction and typically operated with limited draft.

It is another object of the invention to provide an improved portable sailing rig, of a type capable of towing swimmers as well as various vehicles. The foregoing and other objects of the invention will become more readily apparent from the following detailed description, when considered in conjunction with the drawings.

BRIEF DESCRIPTION OF THE DRAWINGS

FIG. 1 shows a side elevation view of a sailing craft according to the invention;

FIG. 2 is a top plan view of FIG. 1 taken along the line 2—2 thereof;

FIG. 3 is a top plan schematic taken along the line 3—3 of FIG. 1 for showing operation of the means for disposing a fin variously across the course of the craft;

FIG. 4 is an enlarged detail view in section of the supporting means for carrying the control fin;

FIG. 5 is an elevation view partly broken away for clarity and in enlarged detail of FIG. 4 taken along the line 5—5 thereof;

FIG. 6 is a bottom plan view of FIG. 4 taken along the line 6—6 thereof;

FIG. 7 is a bottom plan view as viewed from below of FIG. 4 taken along the line 7—7 thereof;

FIG. 8 shows an enlarged detail view of a control board assembly carried at the rear of the rearwardly extending frame;

FIG. 9 shows a side elevation of FIG. 8 in enlarged detail and incorporating portions of the support vehicle;

FIG. 10 is a top plan diagram showing the means for rotatably operating the control fin according to the invention;

FIG. 11 is an end view of a portion of FIG. 9 showing details of construction of the support vehicle;

FIG. 12 shows a side elevation view (somewhat similar to FIG. 9) of another embodiment according to the invention, for a sailing craft and a portable sailing rig.

FIG. 13 is a top plan view of FIG. 12, with the tubular frame member and fin not shown.

DETAILED DESCRIPTION OF PREFERRED EMBODIMENTS

A wind-propelled craft 10 includes a pair of transport floats 11, 12 spaced apart so as to flank the course 13 which the craft 10 travels while on a dead run. A support vehicle 14 for carrying a user forms, in general, the third corner of a triangular configuration and trails the leading transport floats 11, 12. Ventilated deflector plates 15 are attached to transport floats 11, 12 for better reduction of drag before planing takes place.

A frame 20 includes an upstanding tubular member 16 located generally at the center of the triangular configuration and with a fixture 17 carried at its foot. Three additional tubular members are pivotally secured to clevis-like portions formed beneath fixture 17. Thus, fixture 17 includes three rigid V-shaped or curved members 22 secured to the bottom of the fixture and extending downwardly therefrom whereby pins 23 can be disposed through a tongue portion 24 of each of members 18, 19 and 21.

Means for securing tubular member 16 anchored to fixture 17 includes the clevis 26, pin 27 and an elongated threaded bolt 28 disposed lengthwise through a boss 29 formed axially of and as a portion of fixture 17.

As thus arranged, the four tubular members extend at substantially equal angles from each other. Members 18 and 19 are disposed in supported relation relative to floats 11 and 12 by coupling the outer ends of the members to a clevis 31 carried on the upper surface of floats 11, 12. The ends of each adjacent pair of tubular members are coupled together by means of stays 32, 33, 34, 36, 37 and 38 preferably being of nylon or wire whereby the frame 20 is semi-rigid.

Means have been provided for further bracing the frame members consisting of the diagonally arranged stays 39 disposed intermediate the ends of the members.

Means have been further provided for distending a planing plate 40 and control fin 41 downwardly from fixture 17 to normally engage the water. Thus, an elongate support member such as the hollow tube 42 is pivotally supported to move to positions other than directly in line with member 16 by means of a clevis 43 carried beneath bolt 28 as a part thereof and arranged to rotate about the axis of bolt 28. A clevis pin 44 extends through the sides of clevis 43 and also through a tongue extension 46 extending upwardly from a cap member 47 threadedly engaging the upper end of tube 42.

The lower end of tube 42 is formed with a threaded enlarged flange 48 for threadedly receiving an annular hat-shaped plate 49 thereon. The flange portion of plate 49 includes a number of openings 51 through which control lines 52 may be secured.

Fin 41 is rotatably carried immediately beneath plate 49 by means of a pair of stabilizing bearings or collars 53, 54 respectively fixed to the upper and lower ends of a tubular axis or support 56.

As thus arranged, the stabilizing bearings 53 ride against the interior side wall of tube 42 at the upper and lower ends thereof and are fixed axially to the tube 56 so that bearing 54 also rides against the lip 49a of plate 49 to retain tubular support shaft 56 within tube 42.

Means operable from support vehicle 14 are provided for rotating fin 41 about an upstanding axis. Thus, a transversely extending control bar 57 is mounted immediately above fin 41 and below plate 49 and (FIGS. 8 and 10) a control line 58 is trained about pulley 59, the ends of line 58 being secured to control bar 57. The course 13 shown in FIG. 10 is a port reach.

The grooved pulley 59 is mounted for rotation in a horizontal plane upon a control board 61 by means of the mounting post 62. A trunnion 63 carried integrally with the upper surface of control board 61 includes a trunnion pin 64 which passes through the end tongue 66 of tubular member 21 so as to pivotally secure the outer end of member 21 thereto. As thus arranged, board 61 can pivot relative to the end of member 21 as the craft rides through the water. Restraining stays can limit pivoting of board 61 if needed. Support vehicle 14 includes a rigid top deck 67 of suitable material, such as plywood, beneath which a pair of U-shaped flanged angle members 68 extend longitudinally of deck 67 at the side margins thereof.

By suitable means (not shown) the flange portions of angle members 68 are attached to the underside of deck 67. Transversely between angle members 68 at the leading and trailing ends of vehicle 14, planing members 69, 71 are disposed in slightly spaced relation below deck 67 whereby vehicle 14 can be supported during movement by the trailing edge margin 72 of each member 69 thereby minimizing the resistance of the craft to movement through the water.

Means for inhibiting sidewise movement includes side fins 73 disposed at the port and starboard sides of vehicle 14 and extending downwardly into the water to act in the manner of a center-board or keel or other sidewise movement inhibiting means.

As shown in FIG. 9, support vehicle 14 is secured to board 61 by an upstanding post 74 fixed to the top surface of deck 67 extending upwardly therefrom. Coupling assembly 76 serves to permit vehicle 14 to rock to a limited degree relative to board 61. Thus, a resilient stiff rubber diaphragm 77 forms a bottom to the rigid shell 78 of suitable metal and depending downwardly beneath board 61 and secured thereto.

Diaphragm 77 is retained to the bottom of shell 78 by means of a number of peripheral bolts 79 disposed around the lower edge of shell 78 and serving to clamp a retaining ring 81 tightly against the periphery of diaphragm 77.

The upper end of post 74 includes a threaded portion which carries a pair of large size washers 82 on opposite sides of diaphragm 77 so that, by tightening a nut thereagainst, the washers will retain diaphragm 77 and assembly 76 to the upper end of post 74 to permit a limited rocking movement between board 61 and vehicle 14.

Preferably, fins 73 are disposed close to the vertical axis 83 through trunnion pin 64 and post 74 (FIG. 1) to aid in directional stability of the support vehicle 14.

For comfort and buoyancy, a pad or mat 84 is strapped to the top side of deck 67 to extend from the rearward edge thereof forwardly to a position somewhat removed from the leading edge of deck 67 so that it does not interfere with the rocking movements of board 61 relative to deck 67. Thus, the straps 86 are of conventional design and attached by means of simplified hooks 87 to the port and starboard edges of deck 67.

Control board 61 further includes a pair of hand holes 88, 89 whereby a sailor riding on vehicle 14 can readily manipulate control lines 52. Lines 52 actually constitute a single control line secured as above noted at one end to one side of circular plate 49, reeved through a pulley 91 (FIG. 3) and then rearwardly via a cam action cleat 92 of a type whereby rearward movement of line 52 will serve to readily open the cleat and permit the line to pass through same but reverse travel is not permitted without manual release of the cleat. Subsequently, line 52 is trained through a guide 93 or fairlead and outwardly through another cam action cleat 94, another pulley 96 (FIG. 3) carried by float 12 and ultimately secured back at plate 49.

A radius stay 97 (FIG. 3) is fixed at a predetermined length between plate 49 secured as above described relative to the ends of control line 52 and at its other end anchored to the end of tubular member 21 as shown in FIG. 9.

At the ends of each of tubular members 18, 19 and 21, an anchoring means is provided which includes a collar 98 sweated onto the end of the member or otherwise secured in fixed relation thereto, which collar 98 includes a flange portion 98a. A second collar 99 is disposed behind collar 98a and arranged to adjustably rotate to a limited degree behind collar 98a. Collar 98a and collar 99 are both used to secure the ends of stays such as 32, 36, 39, 37, etc., as shown best in FIG. 9 to screw-eyes 101 as carried on either collar 98, 99.

Finally, a sail 102 is carried between the distal ends of tubular members 16, 18 and 19. The top of the sail can be attached to the end of member 16 by means of a hook, etc., for small frame and sail. For larger craft, a pulley and halyard (not shown) is useful. Both lower corners of the sail are normally secured to the ends of members 18, 19 with hook-like devices.

In operation, the resultant of the wind forces acting on the sail is in general perpendicular to the sail and passes through a point near the user of the craft. Tendency to capsize about an axis through the two transport floats is minimal, due to leverage of user's weight and to inclination of the top of the sail towards the user. However, the top of a large sail should not be allowed to have an inclination to the extent that a kite-like condition exists, whereby the transport floats are completely unweighted.

Wind forces acting on the frame and stays are in a downwind direction and the resultant of these forces acts through a point near the geometric center of the frame. The frame drag force is only a fraction of the forces acting on the sail itself, but it must be provided for on larger craft. When sailing on the wind, should both transport floats become unweighted, a tendency for overturning about an axis passing through the leeward float and the user would result.

If no provision has been made to adjust the sail when underway, the correct sail inclination must be set in the design, depending in part of the weight of the frame and attachments. For instance, a sail set on a frame with the tubular member 16 slightly tipped towards the floats (with the sail more nearly vertical) will generate more weight on the floats, thus preventing the above mentioned type of overturning.

A second eventuality arising from frame drag force is a rotation of the light frame about an upstanding axis passing through the user. The fin 41 disposed in the water prevents this type of rotation. Of course sails can be entirely hand-held with craft such as existing kiteboards, but with larger sail areas and in high winds it becomes increasingly difficult to hand-hold a sail in the correct attitude and still prevent capsize.

The frame described is preferrably of aluminum tubing or pipe, and is designed for simplicity and low wind resistance. It has sufficient flexibility to allow momentary distortion under shock loading. The fixed sail allows the tubes to be braced with intermediate guys or stays without interference. These symmetric guys effectively resist column-type failure of the lightweight frame-tubes under compressive loading. This frame is an improvement over frames which include compression members lying in the edges or surfaces of a polyhedron. Such tubular members cannot be internally braced by flexible means against buckling in an inward direction, thus heavier members are required.

The craft is sailed in a run by aligning fin 41 perpendicular to the foot of the sail with the wind from the rear, allowing the support vehicle to trail. A reach is accomplished from a run by "trimming the sail" and changing course. The fin is rotated to the desired angle relative to the sail; the resulting non-alignment of fin 41 and fins 73 inititiates a change of course. When the craft has turned to the desired heading, a twisting force on the frame applied through the arms of the user realligns the support vehicle and its fins 73 with fin 41, at the same time maintaining the angle between fin 41 and the sail. The twisting force required by the user is lessened by means of lateral movement of fin 41, attached to pivotally supported tube 42. Lateral adjustment of the fin's position changes the craft's directional stability or "balance" when sailing on a reach.

The craft is not suited for coming about from one tack to the other, since a head wind would be encountered by the full surface of the sail. All turning is best accomplished by jibing, which is not difficult for this craft even in the strongest breezes.

The lateral stability of the described small support vehicle is influenced by the weight of the user. Rolling tendencies, caused primarily by side thrust forces imparted by the water on fins 73, are neutralized by a slight weight shift to windward. There is an absence of the heeling moment on the support vehicle which are associated with a conventional dinghy-like craft propelled by a sail on a mast. Roll of the support vehicle is further restrained by the influence of the coupling assembly 76.

The provision of a support vehicle for the user separate from the frame is influenced by hydrodynamic and mechanical considerations. A sailor supported by a canvas stretched across a frame, for example, would necessitate at least one relatively large buoyant float attached to the frame. Unlike small floats 11, 12, which function with varying relative direction of oncoming water, a large float will not function efficiently in such a manner, requiring provision for pivoting about an upstanding axis. However, a mere vertical spindle will not withstand the forces of irregular water surface buffeting a large float, thus a flexible coupling method is provided. Rolling and trim problems which are invited by a flexible coupling are solved by placement of the user directly on the single support vehicle.

While the foregoing embodiments of the sailing apparatus provide the advantages noted above, it has been observed that additional operating capability can be achieved utilizing an embodiment of the type shown in FIGS. 12 and 13. Inasmuch as the embodiment represented by FIGS. 12 and 13 includes some components similar to those described in the above embodiments, the numbering of the prior components now shown in FIGS. 12 and 13 has been retained with the convention that all such numbers have been increased by the addition of a third order digit 2 and further explanation of such parts can thereby be eliminated.

As shown in FIG. 9, the pair of side fins 73 serves to inhibit leeway of support vehicle 14. As shown in FIG. 12, a fin 150 depends downwardly from a corner region of the framework, and rotates independently of the positioning of any towed vehicle. Fin 150 and fin 41 (FIG. 1) act as a pair and, in this way, provide improved directional stability and course holding. As thus arranged, sufficient leeway-preventing means is carried entirely by the frame, and no such means is required by a towed vehicle. Further, a swimmer can be effectively towed.

Accordingly, fin 150 is journalled for rotation by means of the annular spindle support 151, which serves to journal the spindle 152 therethrough. Spindle 152 is secured at the lower end, as by welding or other suitable means, to fin 150. Spindle 152 passes through bushings 153, 154 and 155 and at its upper end carries a control arm 156 and pin 157. Control arm 156 is movable in an arc to position fin 150. Spindle support 151 is bolted to control board 158 and includes a trunnion 159, side flanges 160 and 161, and a rear flange 162 with a hole 163. Hole 163 is adapted to be secured by a towed user by means of an inserted rope, bar for grasping, etc. Stays 164 and 165 are secured to side flanges 160 and 161 and serve the same function as stay 36 in prior embodiments. Additional stays 166 and 167 extend between front corners of control board 158 and floats 11 and 12. Stays 164–167 serve the function of inhibiting rotation of the control board, which is acted upon by torsional loads of fin 150.

Operation is similar to previously described operation, in that sail trim is accomplished by means of rotating fin 41; turns are initiated by unalligning fin 41 with trailing fins (in this case, the single fin 150 is the trailing fin); a straight course is sailed by alligning all fins. Some differences exist, however. A vehicle or swimmer towed by the embodiment with fin 150 trails the frame freely on all points of sailing; no effort is required to maintain a trailing support vehicle in a prescribed angular position relative to the frame. Thus, means for moving fin 41 laterally (FIGS. 3 and 8) are not needed. Additionally, a towed vehicle without forces associated with leeway-inhibiting means (fins) is stable laterally and does not require any weight-shifting of the user, to prevent roll. It is presumed that the attachment point between the frame and the towed vehicle is sufficiently low to the water so as to not impart any significant rolling moments, for all embodiments.

Other variations of aforementioned embodiments are useful. A boat which has a tiller or other means steering may be attached to to the frame of the apparatus and towed as follows: A length of rope is attached to the framework, such as through hole 163 shown in FIG. 12, or through holes 88 and 89 of the embodiment shown in FIG. 8. The other end of the rope (towline) is attached roughly amidships of the boat to be towed. Front floats 11, 12 engage the water; fins 41, 150 do not and can be dispensed with. Steering is done with the boat's own devices, such as a tiller. Sail trim is accomplished by further lines, hand held or otherwise, and attached to framework near front floats 11, 12. Resistance to leeway is provided by the boat. Rolling tendencies (small boats) are counteracted by windward positioning of user or users. Larger boats may have sufficient lateral stability to not have such a roll problem.

If, in this application the frame is tilted forward (towards the sail), the altered trim of the front floats should be taken into account for planing purposes.

The invention may be utilized on ice or land. A version for ice use has smooth, convex surface engaging skids in place of the front floats 11, 12 of the water apparatus. A rotatable ice blade replaces fin 41 and a bladed ice vehicle or an ice skater is positioned for towing.

Similarly, a land apparatus results when the front floats are replaced with castors, a wheel and axle replaces fin 41, and a suitable object on wheels is secured to the frame for towing.

I claim:

1. A wind-propelled craft for transport on a medium, comprising: a pair of spaced transport members and a support member disposed generally at the corners of a triangular configuration, said support member having a downwardly extending fin disposed in the medium for inhibiting sideways movement of said support member; a mast upstanding from said triangular configuration; frame means including stays and spars disposed radially from the foot of the mast and extending from said transport members and support member to the foot of said mast for maintaining said mast upstanding and for maintaining the triangular configuration of said spaced transport and support members; a second fin centrally disposed in the triangular configuration proximate to the mast and extending into the medium for inhibiting sideways movement of the craft; means supporting said second fin for both rotation and translation with respect to the frame means; attachment means pivotally securing the frame means to said support member; a sail operatively connected to the frame means and having corners describing essentially a plane; and means for maintaining said attachment means at a fixed distance from said plane.

2. The wind-propelled craft according to claim 1 wherein the supporting means for the second fin includes: an elongate support member having two ends and located beneath the foot of said mast, said mast being spaced above the medium; and pivotal mounting means for connecting one end of the support member to the foot of the mast, the second fin being supported for rotation and translation at the other end of the support member.

* * * * *